United States Patent [19]
Ruf

[11] Patent Number: 5,850,048
[45] Date of Patent: Dec. 15, 1998

[54] DIGITAL READ-OUT ELECTRONIC METRONOME

[76] Inventor: Karen Ruf, 3601 Denson Dr., Sterling Heights, Mich. 48310

[21] Appl. No.: 718,818

[22] Filed: Sep. 27, 1996

Related U.S. Application Data

[60] Provisional application No. 60/004,613 Sep. 29, 1995.
[51] Int. Cl.[6] .................................................. G09B 15/00
[52] U.S. Cl. ............................... 84/484; 84/477 R; 84/43
[58] Field of Search ................................ 84/484, 477 R; D10/43

[56] References Cited

U.S. PATENT DOCUMENTS

| | | | |
|---|---|---|---|
| D. 343,186 | 1/1994 | Omuro | D17/99 |
| 4,089,246 | 5/1978 | Kooker | 84/484 |
| 4,163,409 | 8/1979 | Rumer, Jr. et al. | 84/484 |
| 4,380,185 | 4/1983 | Holcomb | 84/1.03 |
| 4,612,841 | 9/1986 | Yoshikawa | 84/484 |
| 4,733,593 | 3/1988 | Rothbart | 84/484 |
| 5,214,228 | 5/1993 | Hoiles | 84/470 |
| 5,515,764 | 5/1996 | Rosen | 84/484 |

*Primary Examiner*—William M. Shoop, Jr.
*Assistant Examiner*—Kim Lockett
*Attorney, Agent, or Firm*—Gifford, Krass, Groh, Sprinkle, Patmore, Anderson & Citkowski

[57] ABSTRACT

An electronic metronome displays the correct beat per measure. The unit preferably includes a keyboard associated with the entry of a musical signature including the number of beats per measure, timing means to generate an electronic version of the musical signature, a memory for storing information relating to the musical signature, and an electronic controller to store information representative of the musical signature entered by way of the keyboard, convert the signal generated by the timing means into a visual representation of the musical signature suitable for viewing on the display, and update the display in accordance with beats per measure aspect of the musical signature so that a user may be visually informed as to the correct beat of the measure. In one disclosed embodiment the user is visually informed as to the correct beat per measure in the form of a digital readout of beat number. In an alternative embodiment, a graphical representation of a measure with visual indicia highlighting the current beat is used for this purpose. The keyboard may also include a tempo key and a set of numerical keys facilitating the entry of a desired tempo, and one or more tempo preset keys. In a preferred embodiment, the unit is pocket-sized and battery-operated.

12 Claims, 3 Drawing Sheets

DIGITAL READ-OUT ELECTRONIC METRONOME

REFERENCE TO RELATED APPLICATION

This application claims priority of U.S. provisional application Ser. No. 60/004,613, filed Sep. 29, 1995, the entire contents of which are incorporated herein by reference.

FIELD OF THE INVENTION

The present invention relates generally to metronomes for musical timekeeping and, more particularly, to such a metronome which, among other functions, provides a display of the current beat in a measure.

BACKGROUND OF THE INVENTION

A metronome is an instrument used for marking time, and has since become synonymous with musical timekeeping. Metronomes have been available for quite some time, and have evolved from earlier mechanically driven, wind-up versions to more modern, digital electronic types such as that described in U.S. Pat. No. 5,214,228 to Hoiles et al entitled "Electronic Metronome." However, as with other available devices, in this prior-art unit only a non-specific visual indication of the beat is provided, and not which beat is occurring within a measure. That is to say, currently available metronomes may beep or flash a light with each beat, but given, for example, four beats per light, the musician may not know that it is beat 2, beat 3, etc. Current versions also lack other convenient operational features.

SUMMARY OF THE INVENTION

This invention therefore provides a portable electronic metronome which not only indicates beat through an auditory and visual indicator, but also includes a visual read-out of which beat is occurring per measure. Thus, for example, in 4/4 times, the display would advance from one to two to three to four in accordance with a selected time signature. This invention therefore provides a significant number of benefits and advantages, including additional information communicated to the musician in the event he or she gets lost, while also providing a way for deaf musicians to keep exact time.

In addition to the display, a device according to the invention preferably includes a keyboard associated with the entry of a musical signature including the number of beats per measure, timing means to generate an electronic version of the musical signature, a memory for storing information relating to the musical signature, and an electronic controller connected to the keyboard, memory, display and timing means, the controller being operative store in the memory information representative of the musical signature entered by way of the keyboard, convert the signal generated by the timing means into a visual representation of the musical signature suitable for viewing on the display, and update the display in accordance with beats per measure aspect of the musical signature so that a user of the metronome may be visually informed as to the correct beat of the measure. In one embodiment of the invention, a user is visually informed as to the correct beat per measure in the form of a digital readout of beat number. In an alternative embodiment, the user is visually informed as to the correct beat per measure through a graphical representation of a measure with visual indicia highlighting the current beat. In further embodiments a combination of these techniques may be used and, regardless of embodiment, a sound generator may be employed to produce an audible tone representative of the chosen musical signature.

The keyboard may also include a tempo key and a set of numerical keys facilitating the entry of a desired tempo, with the controller being further operative to store information representative of the desired tempo in the memory and display the tempo in numerical form on the display. Additionally, the keyboard may provide one or more tempo preset keys facilitating the entry of a preset tempo in conjunction with the numerical keys, in which case the controller is used to store information representative of each preset tempo in the memory, recall the preset information upon the subsequent activation of a preset key, and display the tempo in numerical form on the display. In a pocket-sized, preferred embodiment of the invention, the keyboard and display are supported on the enclosure, with the keyboard including one or more keys associated with the entry of a musical signature including the number of beats per measure. The memory, timing means and the controller in this case are battery operated along with additional electronic circuitry disposed within the enclosure.

DETAILED DESCRIPTION OF THE PREFERRED EMBODIMENT

Figure 1:
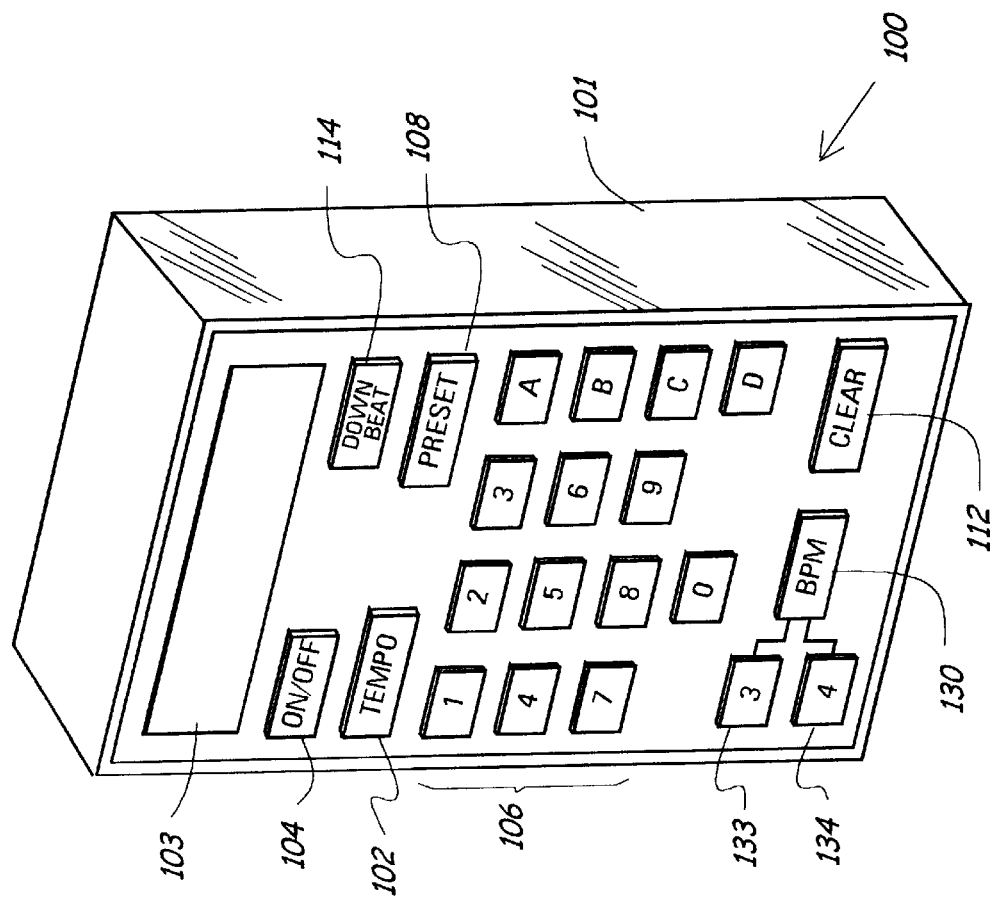
FIG. 1 illustrates, from an oblique perspective, an enclosure according to the invention with the labeling of operational buttons and positioning of a display.

As shown in FIG. 1, the system, depicted generally at 100, is preferably contained within an enclosure 102 and battery operated, facilitating transportation in the pocket or purse. The enclosure includes a display 103, preferably one which can be clearly visible from two or three feet away, such as an LED display or back-lit LCD display in the event of low lighting conditions. Upon activation of an ON/OFF button 104, the system becomes operative, and enables a user to enter an initial tempo directly, by depressing the TEMPO key 102 followed by a numeric entry. Upon selection, the timing is displayed on display 103, along with a numerical read-out of the exact beat per measure.

Letters keys A through D are used in conjunction with the storage of a preset tempo for easier and more convenient use and recall. For example, to preset a tempo of 90 the PRESET button 108 would be depressed, followed by depression of the numeric keys 9 and 0 on the keypad 106, followed by a letter which would then be used subsequently for an immediate recall of that particular tempo. To enter at 120, the preset key 108 would be depressed followed by 1-2-0 on the numeric keypad, again followed by the user's letter of choice. To clear the presets, the user would press the CLEAR button 112 followed by the letter of the preset to be eliminated or, alternatively, should the user simply enter a different preset into that letter, the previously preset value would automatically be overwritten.

A DOWNBEAT key 114 would be used to select a downbeat option, for example, through a single key depression to activate and a second key depression to disengage. The beat number would remain on the screen 103 in this case, but, with the activation of a downbeat option, a plus sign (+) would appear when this option is engaged. The BPM key 130, which stands for "beats per measure" would be used in conjunction with the 3 and 4 keys 133 and 134, respectively, to enter 3/4 and 4/4 time signatures, respectively, as these are the most common. For example, if a song starts in 4/4 time, the "4" key 134 would simply be depressed by the instructor or student. If, however, halfway through the song the signature changes to 3/4 time, the operator need only depress the "3" key 133, which will change the screen to three beats per measure. The BPM key 130 may also be used to enter other time signatures, for example, to enter 5/4 time, the BPM key would be depressed, followed by a 5. For 6/8 time, the BPM key 130 would be depressed followed by a 6, etc. To return to 3/4 or 4/4 time, the 3 and 4 keys, 133 and 134, respectively, would simply be depressed a single time.

As the system preferably would be held in an upright position, a stand or a clip would alternatively be made available having a first component which clips onto a music stand or rim of a base drum, for example, but with a second component adapted to fit the enclosure 102 for convenient access. One or the other of the components of the stand would also be pivotable to adjust for a particular viewing preference.

Figure 2:
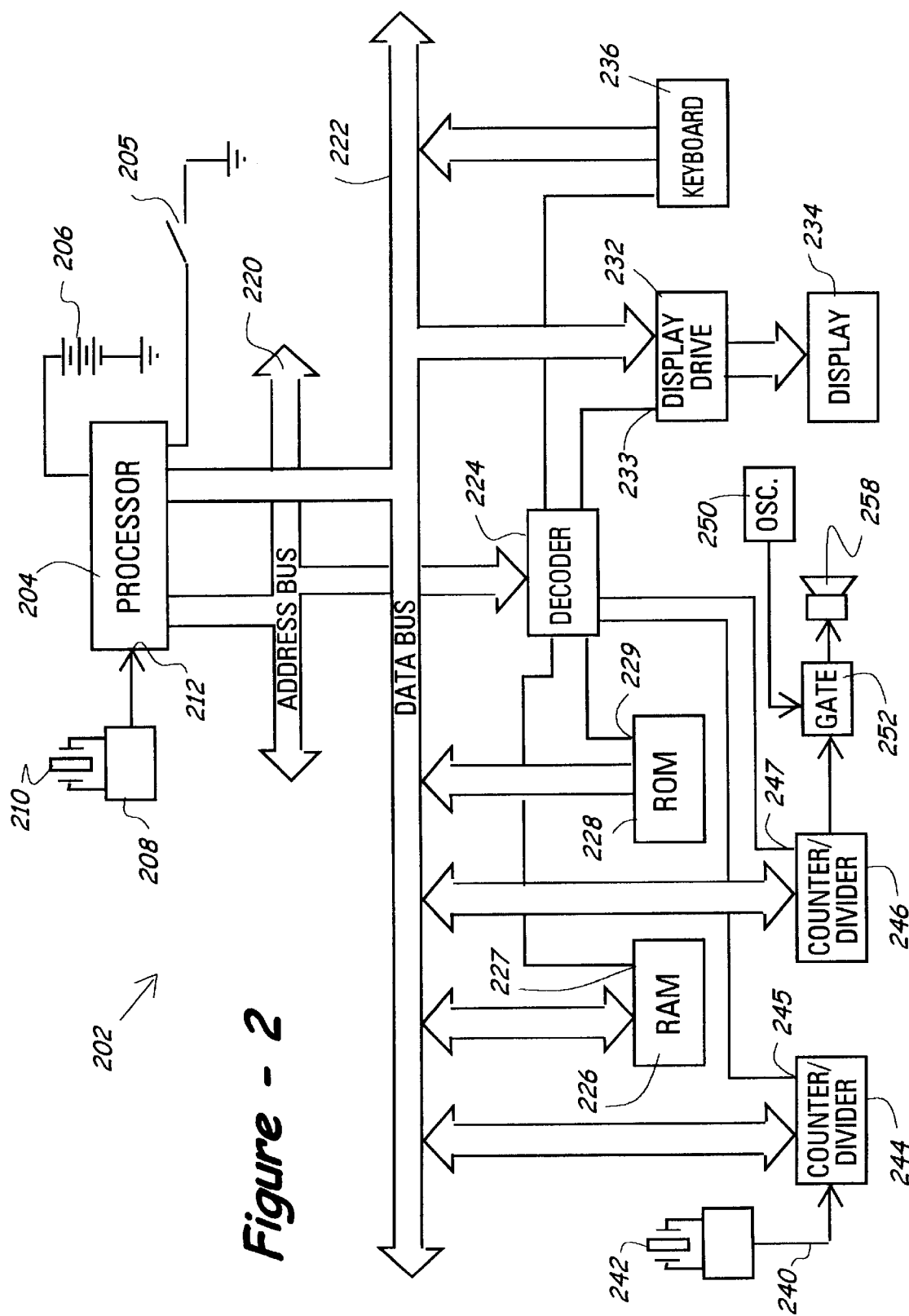
FIG. 2 is a block diagram depicting major electronic components and subsystems according to the invention.

Turning now to FIG. 2, there is shown in block-diagram form, electronic components and subsystems used to construct a preferred hardware aspect of the invention. Although discrete components may be used to build the apparatus which will now be described, in the preferred embodiment, a microprocessor 204 or single-chip microcomputer is instead used to reduce the parts count and provide for more centralized control. The processor 204 may be commercially obtained from manufacturers such as Motorola, Inc., the Intel Corp., and others and, as with other components described herein, a complimentary-MOS or C-MOS version of the device is preferably used to reduce power drain, which, as discussed above, will be provided in the form of a battery 206. Although other connections from the battery 206 to other components are not shown in the figure, such connections are implied to realize an operational unit.

As with most microprocessor devices, a crystal 210 is used to provide an accurate time base in conjunction with an oscillator circuit 208 which may include a microvibrator, the output of which feeds the clock input 212 of the processor chip 204. In the event that the processor 204 is a microprocessor as opposed to a single-chip microcomputer, address bus 220 and data bus 222 may be made available external to the device 204 to perform various functions and data transfers. For example, random-access memory (RAM) 226 may be interfaced to the data bus as shown to provide additional storage capabilities beyond those available in the processor 204 proper. Being of the read/write type, memory 226 will typically be used to store temporary results, information relating to the current operator configuration, and so forth. In the event that it is desirable to have the contents of such memory non-volatile, that is, to have the information stored therein remain available even when the unit 202 has been turned off for active usage, battery 206 or a separate power source may be used to "back-up" the RAM 226 to provide such non-volatility. As a further alternative, one of many inherently non-volatile memory technologies may be used instead of, or in conjunction with, RAM 226, including those of the electrically erasable programmable read-only memory (EE-PROM) variety. As with other devices discussed below, access to RAM 226 may be controlled through the use of a decoder 224 interfaced to the address bus 220. Such a configuration, known to those engaged in the art of microprocessor-based systems design, enables certain devices to be controlled as a function of memory address, thus enabling components to be selected in an organized fashion in accordance with a memory map constructed during programming of the processor 204, as discussed below. In operation, by placing the appropriate address on address bus 220, decoder 224, recognizing that such address corresponds to the activation of RAM 226, causes a signal along line 227 to be asserted, which is typically connected to the chip-enable input to the RAM 226, enabling data to be stored or retrieved over data bus 222 in accordance with the timing diagram for that particular component.

In terms of software program storage, again, in the event that sufficient program storage is not available within processor 204, an additional read-only memory (ROM) device 228 may optionally be provided. Unlike the read/write capabilities of RAM 226, ROM 228 is preferably of the erasable/programmable (EPROM) or fused-link types, facilitating inherent non-volatility to guard against loss of the control program responsible for the overall operation of the unit 202. ROM 228 may also be selected through a particular address emanating from the processor 204 using the decoder 224 to generate an appropriate chip-select signal.

The address decoder 224 may also be used to update a display 234 using a select line 238. In the embodiment shown, a display driver chip 232 has been added to store information pertaining to the current display, which is then used to refresh the display panel itself so as to off-load the processor 204 from updating the display on a frequent, repeating basis. Such display driver components 232 are available commercially from manufacturers such as Philips Display Components Division, for use, for example, with liquid-crystal displays (LCDs), which tend to have a very large number of input/output (I/O) pins. However, as will be recognized by one of skill in the art of microprocessor system design, there does not exist single-chip microcomputers in particular incorporating the capability to drive a display panel directly, including an LCD display panel. In an alternative embodiment, if such a processor is used according to the invention, the need for display driver chip 232 may be obviated, depending upon desired functional capabilities and economic considerations.

A keyboard 236, enabled by a select line 237, includes sufficient buttons to correspond with those with at least those depicted in FIG. 1, which represents a preferred embodiment of the invention. Implementations of the keyboard 236 may come in various forms, including momentary-contact versions, membrane switches, and so forth, and a dedicated keyboard-scanning circuit may be used or, as shown, the processor 204 may scan the keyboard directly using a portion of its internal control program to debounce the key closures, as required. Debouncing, which refers to a method of sampling the status of each key several times during a scanning operation to more accurate identify a true, single key closure, is also well known to one familiar with keyboard design and implementation.

To keep track of the music-specific time signatures associated with the unit's metronome functions, the unit may either include one or more discrete counter/divider chips such as device 244, or, alternatively, timing may be managed internal to the processor 204 in conjunction with control software. The advantage of using the internal capabilities of the processor 204 are a potential reduction in overall parts count, though the disadvantages include the requirement that the software program controlling the device 204 may assume undesirable time constraints which complicate programming, and, if the musical timing is based upon a single crystal 210 and oscillator 208, inaccurate timing signatures may result. Therefore, in a preferred embodiment, a separate crystal 242 and oscillator 240 are implemented, with the oscillator frequency being chosen for the most appropriate match to accurate musical timing. The output of this oscillator 240 feeds one or more counter/divider chips 244 and 246, for example, which in turn feed a signal to a gate 252 switching audio oscillator 250 to a speaker 258. The oscillator preferably produces audible tones representative of a selected time signature which are more pleasant the square waves emanating from the counter/divider chips, since, these being digital, produce a somewhat harsh sound effect.

The counter/dividers 244 and 246 preferably include a load capability activated by enable lines 245 and 247, respectively, allowing a particular timing signature entered by an operator to be automatically loaded into the counter/dividers, from what point that signature will be made immediately available, both in terms of an audible tone and on the display 234, as an output from the processor 204. The ability to load counter/dividers directly also simplifies programming of the unit, in the sense that the parameters to be loaded for a particular timing signature may be contained in a look-up table, either in the microprocessor 204, or external non-volatile memory, thus simplifying the procedure involved.

Figure 3:
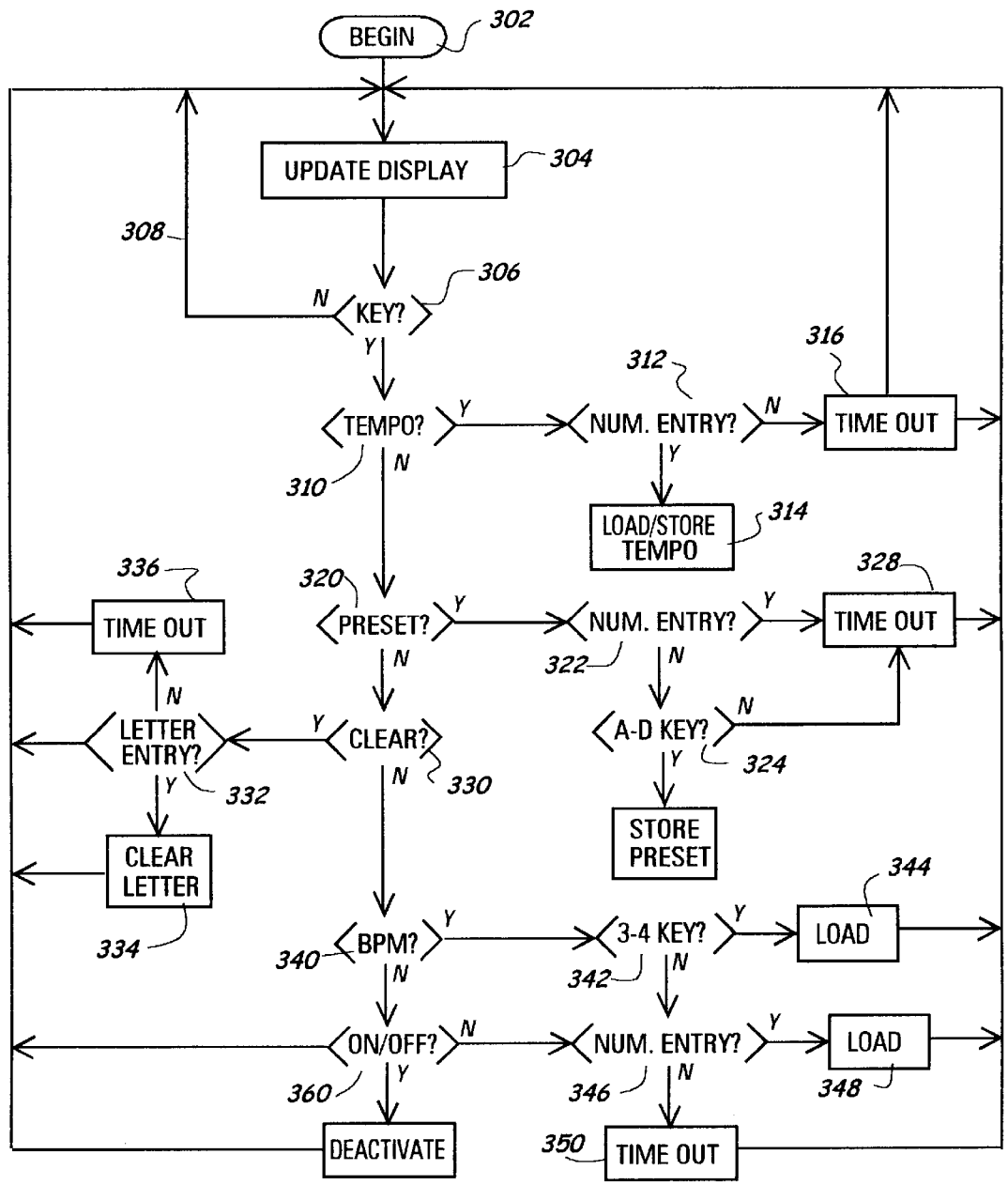
FIG. 3 is a flow chart used to show major software aspects of the invention.

Now turning to FIG. 3, there is shown, in flow-diagram form, major software subroutines enabling one of skill in the art of programming to construct a device to perform according to the invention. At block 302, the unit recognizes that it has been turned on by user, and carries out any initialization procedures that might be required, including any self-test operations that may be desirable to be performed. As in the case of most software programs of the type, control flow generally proceeds from top to bottom as shown in the figure, with the most time-critical procedures being carried out first, leaving the least time-critical operations last, in the case, the various keyboard scanning functions.

At block 304, the display is updated. Although in many cases the display update will not be a time-critical operation, in the event that a relatively high beats per measure has been selected by the operator, display updates may need to occur at a relatively high rate as discussed below.

Having updated the display, the program scans the keyboard at decision block 306, and in the event that no keys are depressed, the program will loop as depicted by line 308, simply updating the display as necessary. In the event that a key is depressed, the program interprets each key function and executes the representative operation. In some case, the depression of a particular key will call for the depression of an additional key before a particular operation is completed. The depression of the tempo key at decision block 310 results in a further inquiry at decision block 312 as to whether or not a numeric entry has been received. If it has, the numeric entry representative of the entered tempo is loaded or stored at block 314 with a change in the audible tone and display being carried out at block 304. In the event that a numeric entry is not received after a predetermined amount of time, several seconds, for example, the result will be a time out at block 360 canceling the tempo entry function, and returning to a point above the update display routine.

Recognition of a depression of the preset key at point 320 will also result in a further inquiry, first as to the entry of a numeric value at block 322, followed by a query as to whether one of the letter key A through D has been depressed at decision block 324. If a letter is entered, preset is stored at block 326. If, however, either numeric entry from decision block 322 or the A to D inquiry is not satisfied, the system will time out at block 328, canceling the preset operation.

If the clear key is entered at decision point 330, a further inquiry is initiated at decision block 332 to ascertain whether one of the letter keys has been depressed. If so, the preset associated with that letter is cleared at block 334, but if not, after a predetermined time at block 336, this function is timed out as well, and canceled.

If the beats-per-minute (BPM) key is depressed at block 340, the keyboard continues to be scanned to determine if the 3 or 4 key has been entered at step 342 and, if so, that value is loaded at block 344. If not, however, the numeric keypad continues to be scanned to determine whether a particular number has been entered at block 346, in which case, if a number has been entered, the BPM corresponding to that number is loaded at block 348. As with other operations requiring further key entries, if a suitable follow-up key depression has not been entered, the software is programmed to time out at block 350, leading to a cancellation of the BPM function. If the ON/OFF switch has been depressed, the system shuts down at block 360, but if not, assuming no other keys have been depressed, the unit cycles back to a point above the update display routine, and the various loops just described are continued.

Figure 4:
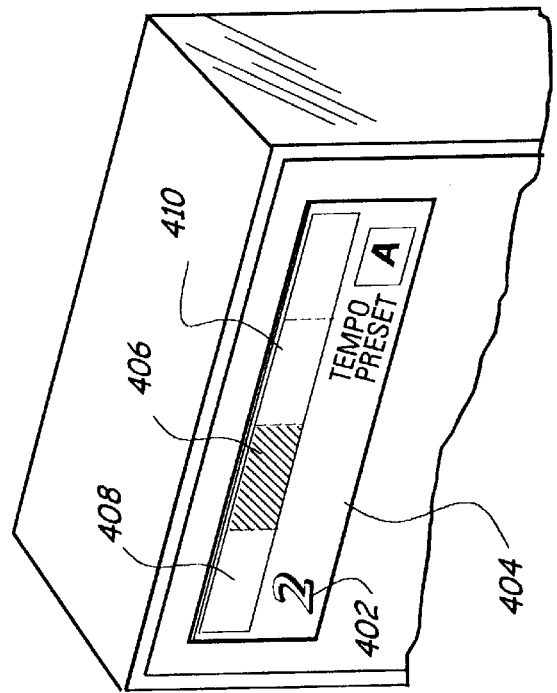
FIG. 4 is a drawing of a display according to the invention showing how the current portion of a given measure may be indicated.

FIG. 4 shows a typical display on the display panel depicted in FIG. 1 according to the invention. Reference will now be made to FIG. 4, which shows a representative display according to the invention, in this 4:4 time. In the example shown, the count is in the second beat for the measure, and, in a preferred embodiment, in addition to the digital readout of the number 2 at 402 which indicates the second beat of the measure, a graphical display 404 may additionally be used, with a shading 406 being used to indicate that the timing is currently in the second beat of the measure. By implication, the first quarter 408 of the measure would have been shaded on the last beat, and, following the second quarter, the third quarter 410 will become highlighted, once that point has been reached.

Having described my invention, I claim:

1. An electronic metronome, comprising:
   a keyboard including one or more keys associated with the entry of a musical signature having a plurality of distinct, sequential beats per measure, including signatures with three or more beats per measure;
   a memory;
   a display for uniquely displaying each beat per measure;
   timing means for generating an electrical signal representative of the musical signature as entered by way of the keyboard; and
   a controller connected to the keyboard, memory, display and timing means, the controller being operative to perform the following functions:
   a) store in the memory information representative of the musical signature as entered by way of the keyboard,
   b) convert the electrical signal generated by the timing means into a visual representation of the musical signature suitable for viewing on the display, and
   c) update the display in accordance with the beat per measure associated with the musical signature as entered so that the display shows each distinct beat in sequential fashion.

2. The electronic metronome of claim 1, wherein:

the keys further include a tempo key and a set of numerical keys facilitating the entry of a desired tempo; and wherein the controller is further operative to store information representative of the desired tempo in the memory and display the tempo in numerical form on the display.

3. The electronic metronome of claim 2, wherein:

the keys further include one or more tempo preset keys facilitating the entry of a preset tempo in conjunction with the numerical keys; and wherein:

the controller being further operative to:

store information representative of each preset tempo in the memory, recall the preset information upon the subsequent activation of a preset key, and display the tempo in numerical form on the display.

4. The electronic metronome of claim 1, wherein the display includes a numerical readout for displaying each beat per measure using a distinct beat number.

5. The electronic metronome of claim 1, wherein the display includes a graphical representation of a measure along with each beat contained therein, with visual indicia for highlighting only the current beat.

6. The electronic metronome of claim 1, further including a sound generator to produce an audible tone in conjunction with each beat per measure.

7. An electronic metronome, comprising:

a pocket-sized enclosure;

a keyboard and display supported on the enclosure, the keyboard including one or more keys associated with the entry of a musical signature having a plurality of distinct sequential beats per measure, including signatures with three or more beats per measure;

battery-operated electronic circuitry disposed within the enclosure, the circuitry including:

a memory;

timing means for generating an electrical signal representative of the musical signature as entered by way of the keyboard; and a controller connected to the keyboard, memory, display and timing means, the controller being operative to perform the following functions:

a) store in the memory information representative of the musical signature as entered by way of the keyboard, b) convert the electrical signal generated by the timing means into a visual representation of the musical signature suitable for viewing on the display, and c) update the display in accordance with the beat per measure associated with the musical signature as entered so that the display shows each distinct beat in sequential fashion.

8. The electronic metronome of claim 7, wherein:

the keys further include a tempo key and a set of numerical keys facilitating the entry of a desired tempo; and the controller is further operative to store information representative of the desired tempo in the memory and display the tempo in numerical form on the display.

9. The electronic metronome of claim 7, wherein:

the keys further include one or more tempo preset keys facilitating the entry of a preset tempo in conjunction with the numerical keys; and the controller being further operative to:

store information representative of each preset tempo in the memory, recall the preset information upon the subsequent activation of a preset key, and display the tempo in numerical form on the display.

10. The electronic metronome of claim 7, wherein the display includes a numerical readout for displaying each beat per measure using a distinct beat number.

11. The electronic metronome of claim 7, wherein the display includes a graphical representative of a measure along with each beat contained therein, with visual indicia for highlighting only the current beat.

12. The electronic metronome of claim 7, the electronic circuitry further including a sound generator to produce an audible tone representative of musical beat.

* * * * *

UNITED STATES PATENT AND TRADEMARK OFFICE
CERTIFICATE OF CORRECTION

PATENT NO. : 5,850,048
DATED : December 15, 1998
INVENTOR(S) : Ruf

It is certified that error appears in the above-indentified patent and that said Letters Patent is hereby corrected as shown below:

Column 6, line 13: Replace "beats-per-minute" with "beats-per-measure".

Signed and Sealed this

Twenty-seventh Day of February, 2001

Attest:

NICHOLAS P. GODICI

Attesting Officer     Acting Director of the United States Patent and Trademark Office